United States Patent [19]

Iwasaki et al.

[11] Patent Number: 5,074,530

[45] Date of Patent: * Dec. 24, 1991

[54] APPARATUS FOR SMELTING REDUCTION OF IRON ORE

[75] Inventors: Katsuhiro Iwasaki; Kenji Takahashi; Shigeru Inoue; Haruyoshi Tanabe; Masahiro Kawakami; Osamu Terada, all of Tokyo, Japan

[73] Assignee: NKK Corporation, Tokyo, Japan

[*] Notice: The portion of the term of this patent subsequent to Jun. 26, 2007 has been disclaimed.

[21] Appl. No.: 599,679

[22] Filed: Oct. 17, 1990

Related U.S. Application Data

[62] Division of Ser. No. 283,218, Dec. 12, 1988, Pat. No. 4,995,906.

[30] Foreign Application Priority Data

Dec. 18, 1987 [JP] Japan .................................. 62-322321
Dec. 18, 1987 [JP] Japan .................................. 62-322322
Dec. 18, 1987 [JP] Japan .................................. 62-322328

[51] Int. Cl.$^5$ .............................................. C21C 5/40
[52] U.S. Cl. .................................... 266/157; 266/172; 266/175
[58] Field of Search ............... 266/157, 172, 176, 186, 266/175, 182

[56] References Cited

U.S. PATENT DOCUMENTS 3,711,275 1/1973 Johnsson .................................. 75/40
4,504,311 3/1985 Weiner .................................. 266/219
4,936,908 6/1990 Takahashi et al. .................... 75/502

FOREIGN PATENT DOCUMENTS 58-144407 8/1983 Japan .................................. 75/38
61-43406 9/1986 Japan .

Primary Examiner—Melvyn J. Andrews
Attorney, Agent, or Firm—Frishauf, Holtz, Goodman & Woodward

[57] ABSTRACT

The invention provides an apparatus for smelting reduction of iron ore which contains (1) at least one preheat and prereduction furnace which preheats and prereduces iron ore to a prereduction degree of less than 30%; (2) a smelting reduction furnace into which the preheated and prereduced iron ore, carbonaceous material and flux are charged and in which the preheated and prereduced iron ore is reduced; and (3) a top blow oxygen lance having first nozzles for decarburization and second nozzles for post-combustion, oxygen gas being blown through the first nozzles and the second nozzles into the smelting reduction furnace. At least one side tuyere is placed in a side wall of the smelting reduction furnace and at least one bottom tuyere is placed in a bottom wall of the smelting reduction furnace for blowing a stirring gas through the at least one side tuyere and the at least one bottom tuyere into the smelting reduction furnace.

4 Claims, 4 Drawing Sheets

APPARATUS FOR SMELTING REDUCTION OF IRON ORE

This is a division of application Ser. No. 07/283,218 filed Dec. 12, 1988, now U.S. Pat. No. 4,995,906.

BACKGROUND OF THE INVENTION

1. Field of the Invention

The present invention relates to a method for smelting reduction of iron ore and an apparatus therefore, and particularly to a method and an apparatus wherein iron ore is being smelted and reduced in a basic oxygen furnace type vessel.

2. Description of Prior Arts

Smelting reduction method has recently been developed as a substitution for a blast furnace iron-making method, to overcome some disadvantages in that the blast furnace iron-making method requires not only an expensive construction cost but also a vast construction site.

In a prior art smelting reduction method, iron ore is prereduced by means of an exhaust gas, and then the prereduced iron ore is charged together with carbonaceous material and flux into a smelting reduction furnace. Furthermore, oxygen gas and stirring gas are blown into the smelting reduction furnace. The carbonaceous material is dissolved into molten metal charged in advanced and, at the same time, C contained in the carbonaceous materials is oxidated by the oxygen gas. Through the heat produced by this oxidation, the iron ore is smelted and reduced by means of C contained in the carbonaceous material to form molten metal bath. CO gas generating from the molten metal bath is post-combusted, by the oxygen gas excessively blown in, into $CO_2$ gas. The sensible heat of this $CO_2$ gas is transferred to a slag layer and iron particles in the slag layer covering the surface of the molten metal bath, and then, to the molten metal bath.

In this manner, the iron ore is reduced into the molten metal. To lighten the load of the reduction in the smelting reduction furnace, the iron ore is prereduced upto a reduction degree of 60 to 75% before the iron ore is charged into the smelting reduction furnace. Therefore, an exhaust gas generating from the smelting reduction furnace is required to be a low oxidated gas which is highly reductive and to also be of a large amount.

SUMMARY OF THE INVENTION

It is an object of the present invention to provide a method for smelting reduction of iron ore and apparatus therefor, wherein an efficiency of heat transfer is improved, the excessive energy to be produced is suppressed to save production cost and to procure the maintenance of the good energy balance, and furthermore, the restriction conditions of the operation is lessened.

In accordance with the present invention, a method is provided for smelting reduction of iron ore, comprising the steps of:

introducing iron ore into at least one preheat and prereduction furnace and preheating and prereducing the iron ore, a prereduction degree being less than 30%;

charging the preheated and prereduced iron ore, carbonaceous material and flux into a smelting reduction furnace;

blowing oxygen gas, through first nozzles for decarburization and second nozzles for post-combustion placed in a top end portion of a top blow oxygen lance, into the smelting reduction furnace, said top end portion of said top blow oxygen lance being located so as to be between an upper side level of and a lower side level of a slag layer;

blowing a stirring gas through at least one side tuyere placed in a side wall of the smelting reduction furnace and at least one bottom tuyere placed in a bottom wall of the smelting reduction furnace, the stirring gas being at least one selected from the group consisting of Ar, $N_2$, CO, $CO_2$ and a process gas; and controlling a flow amount of said oxygen gas and said stirring gas so that an oxidation degree of an exhaust gas generated in the smelting reduction furnace ranges 0.4 to 0.9 and still a temperature of the exhaust gas ranges 300° to 1300° C. when the exhaust gas is introduced into the at least one preheat and prereduction furnace, where the oxidation degree is represented by the formula of $(H_2O+CO_2)/(H_2+H_2O+CO+CO_2)$.

Furthermore, in accordance with the present invention, an apparatus used for the defined method is provided, comprising:

at least one preheat and prereduction furnace which preheats and prereduces iron ore, the iron ore being prereduced to prereduction degree of less than 30%;

a smelting reduction furnace into which the preheated and prereduced iron ore, carbonaceous material and flux are charged and in which the preheated and prereduced iron ore is reduced;

a top blow oxygen lance having first nozzles for decarburization and second nozzles for post-combustion, oxygen gas being blown through the first nozzles and the second nozzles into the smelting reduction furnace; and at least one side tuyere placed in a side wall of the smelting reduction furnace and at least one bottom tuyere placed in a bottom wall of the smelting reduction furnace, a stirring gas being blown through the at least one side tuyere and the at least one bottom tuyere into the smelting reduction furnace.

The object and other objects and advantages of the present invention will become apparent from the detailed description to follow, taken in conjunction with the appended drawings.

DESCRIPTION OF THE PREFERRED EMBODIMENT

Figure 1:
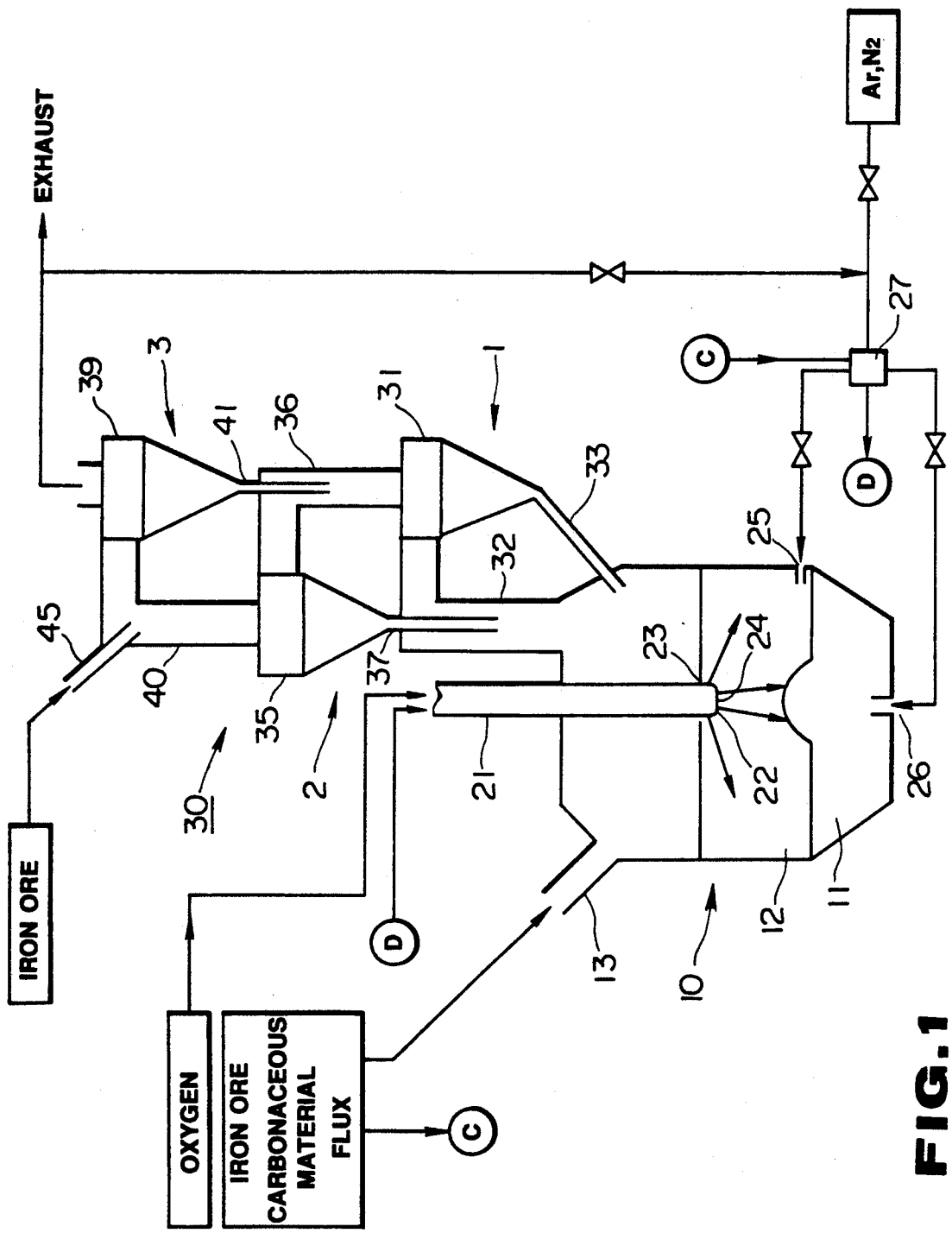
FIG. 1 is a block diagram illustrating an embodiment of an apparatus used for smelting reduction of iron ore of the present invention.

When, in order to lighten the load of the reduction in the smelting reduction furnace, a prereduction degree of iron ore before being charged into the smelting reduction furnace is set to be 30% or more, the oxidation degree (hereinafter referred to as "OD" when the word is abbreviated) of the exhaust gas generated in the smelting reduction furnace is required to be lowered. The OD is represented by the formula of "$(H_2O+CO_2)/(H_2+H_2O+CO+CO_2)$". If the OD is so lowered, the exhaust gas, as a matter of course, increases in amount, which is disclosed, for example, in a Japanese Patent Examined Publication No. 43406/86. As a result, the energy produced in the smelting reduction furnace exceeds 3 Gcal/molten metal ton and therefore, in the light of the total energy balance including steel-making process and a rolling process in one steel works, the produced energy becomes excessive. This lack of the energy balance results naturally in rise of production cost.

Furthermore, when the prereduction degree is 30% or more, an exhaust gas having a low OD value is required and the retention time of the iron ore in the preheat and prereduction furnace has to take a long time. Consequently, it becomes difficult to make balanced charges of the prereduced iron ore into the smelting reduction furnace and discharge of the molten metal. This difficulty causes necessarily sever restrictions on the operation of the smelting reduction furnace.

A prior art method has been taken to increase the smelting speed of the iron ore so as to promote the reduction speed of the iron ore, wherein CO gas in the smelting reduction furnace is post-combusted to make use of the heat produced thanks to the post-combustion. For this combustion, $O_2$ gas is blown in the smelting reduction furnace through tuyeres placed in an upper wall of the smelting reduction furnace. According to this prior art method, however, if the post-combustion ratio is raised, the temperature of the exhaust gas is elevated while, because of lack of the means for transferring the sensible heat of the post-combustion, the heat transfer efficiency is degraded, and therefore, the high temperature exhaust gas is forced to be discharged. Resultantly, a serious problem takes place that, due to the heat attack of this high temperature exhaust gas, the refractory lined on the inwall of the smelting reduction furnace is drastically damaged. For this reason, it is a general concept that the oxidation degree cannot be raised so much.

The inventors obtained some findings, based on the study of a mechanism of the smelting reduction reaction and the measures for specifically responding to the mechanism to improve the heat transfer efficiency and promote the reduction of the iron ore as follows;

① It has been the prior art basic concept as mentioned above, that the post-combustion ratio cannot be greatly improved because of the technological limit in improving the heat transfer efficiency and because of the damage of the inner wall of the smelting reduction furnace due to the post-combution heat attack. However, if oxygen gas is blown into a slag layer and, at the same time, the slag layer is strongly stirred so that the post-combustion is performed within the slag layer, high post-combustion can be procured and the heat transfer efficiency can be simultaneously improved. Thus, thank to the high post-combustion, slag and iron ore contained in the slag layer is heated to a high temperature, and the reduction speed of iron ore by C represented in the formula given below is effectively improved, where C means carbon contained in the molten metal:

$$Fe_2O_3+3C\rightarrow 2Fe+3CO$$

② In the prior art method, there are some examples wherein bottom blow of oxygen gas is continuously carried out during the whole or a certain period of the reduction operation. Such oxygen bottom blow, however, is disadvantageous against the post-combustion. Namely, when the oxygen bottom blow is carried out, a large amount of CO gas is produced in molten metal and the molten metal is strongly stirred. Resultantly, splash of the molten metal goes into the post-combustion zone and C contained in the splashed molten metal reacts with the oxygen gas, thereby the post-combustion ratio being lowered. Consequently, it is necessary to avoid the oxygen bottom blow, regardless of the period of the blowing.

Based on this kowledge and experience, the present invention enables a high speed reduction operation, setting the following conditions:

(a) Side blowing and bottom blowing of stirring gas are combined so that the molten metal is actively diffused into a zone where iron ore exists in a slag layer, and thanks to the diffusion, the reduction of iron ore by work of C contained in the molten metal is promoted.

(b) Nozzles for the decarburization and nozzles for the post-combustion are placed in a tip end portion of a top blow oxygen lance and oxygen gas is blown therethrough into the smelting reduction furnace so that a predetermined OD level or more is procured. The oxygen gas through the nozzle for the post-combustion is introduced into the slag layer to form, in the slag layer, a zone where the post-combustion is carried out. The slag layer is strongly stirred by means of a side blow gas. Thus, heat produced thanks to the post-combustion is transferred to the iron ore.

(c) As stirring gas or carrier gas blown through a side wall as well as a bottom wall, at least one selected from the group consisting of Ar, $N_2$, CO, $CO_2$, and a process gas is used so that the reduction work of C contained in the molten metal and the post-combustion ratio is not degraded.

Now referring specifically to the appended drawings, an embodiment of the present invention will be described. FIG. 1 is a block diagram of an apparatus used for smelting reduction of iron ore of the present invention, using a suspention preheater as a preheat and prereduction furnace. In FIG. 1, two ⓒs mean that one of the two ⓒs is connected to the other, and two Ⓓs mean that one of the two Ⓓs is also connected to the other. In smelting reduction furnace 10, molten metal bath 11 and slag layer 12 are formed. The smelting reduction furnace has first chute 13 placed at an upper portion thereof, through which iron ore, carbonaceous material and flux are charged into the smelting reduction furnace, and top blow oxygen lance 21 inserted down perpendicularly into it. In top end portions of the top blow oxygen lance, first nozzles 22 for decarburization and second nozzles 23 for post-combustion are placed to blow oxygen gas into furnace 10 and, furthermore, at the center of the top portion, third nozzle 24 is placed to blow fine particles or powder of the iron ore, carbonaceous material or flux into furnace 10. Besides, in a side wall and a bottom wall of furnace 10, there are respectively placed side tuyere 25 and bottom tuyere 26 through which Ar, $N_2$, CO, $CO_2$ or a process gas is blown as a stirring gas into the smelting reduction furnace. Pressure device 27 is provided, as a pressure and transfer means, to mix the fine particles or the powder of the iron ore with a carrier gas into a mixture and then, to blow the mixture through side tuyere 25 and bottom tuyere 26 into the smelting reduction furnace.

At an upper portion of furnace 10, a suspension preheater 30 (hereinafter referred to as "SP") is provided, as a preheat and prereduction furnace, wherein the preheat of the iron ore is mainly carried out. SP 30 has multipled units, each of the units having a cyclone, a heat exchange duct and a guide pipe multipled vertically in series. In this embodiment, as shown in FIG. 1, for example, first unit 1 of SP 30 has first cyclone 31, first heat exchange duct 32 and first guide pipe 33 and in this way SP 30 has tripled units i.e. units 1, 2 and 3 vertically in series. The number of the units can be determined, depending upon charged material an heat exchange duct 40 of unit 3 located at the high level has second chute 45 through which coarse grains or minute grains of iron ore are supplied from an ordinary material feeder (not shown in FIG. 1).

Secondly, a method for smelting reduction of iron ore, which is used in the apparatus for smelting reduction of iron ore explained in the foregoing, will be now described. Iron ore, as raw material, is charged through second chute 45 into SP 30. The particle size of the iron ore for this charge is determined by the capacity of SP 30.

An exhaust gas generated in the smelting reduction furnace is introduced into first heat exchange 32, and the exhaust gas transfers its heat, by means of heat exchange, to the iron ore which is coming down through second guide pipe 37 of unit 2 located above unit 1. After the heat exchange, the exhaust gas goes into first cyclone 31 and is separated from the iron ore to be introduced into second heat exchange duct 36. As similarly in this manner, the exhaust gas passes through second heat exchange duct 36 and second cyclone 35 of unit 2 and also through third heat exchange duct 40 and third cyclone 39 of unit 3 to be exhausted. In the meantime, the iron ore, which has been charged through second chute 45 into SP 30, meets with the exhaust gas to obtain the heat from the exhaust gas through heat exchange in a state of floating in third heat exchange duct 40. And then, some of the iron ore that has a comparatively light weight and the other that has a comparatively heavy weight, each, enter, respectively, into cyclone 39 of unit 3 located at an upper level and into cyclone 35 of unit 2 located at a lower level and also are separated from the exhaust gas, respectively therein. Subsequent to the separation, the light weight iron ore and the heavy weight iron ore, each, go down, respectively, through guide pipe 41 of unit 3 and guide pipe 37 of unit 2 into heat exchange duct 36 of unit 2 and heat exchange duct 32 of unit 1 located at lower level. The iron ore is preheated and prereduced and goes finally into smelting reduction furnace 10 through heat exchange duct 32 or guide pipe 33.

At least one of the preheated and prereduced iron ore, the carbonaceous material and the flux which has already been charged into smelting reduction furnace 10 is amply stirred together with molten metal bath 11 and slag layer 12 which have already been formed in the smelting reduction furnace by means of a stirring gas which is injected through tuyeres 25 and 26 placed respectively in the side wall and the bottom wall of the smelting reduction furnace. A process can also be employed wherein this stirring gas is pressurized and mixed with raw material such as fine or powdered particles of the iron ore, carbonaceous material and flux to form a mixture and the mixture is blown in through tuyere 25 or 26, or third nozzle 24 of top blow oxygen lance 21. The employment of this process is effective in promoting the heating and smelting of the iron ore, the slag-making of the flux and the oxidation of the carbonaceous material so as to increase the production amount. Furthermore, it is simple and effective, as a means for charging blocky or granular material, to charge the raw material by means of making use of gravity through first chute 13. Charging material through an outlet for the exhaust gas set in the smelting reduction furnace is disadvantageous because the yield to the charge is remarkably degraded due to the splash of a fine grain size material. Therefore, in stead of making use of the outlet, it is preferable to charge the material through first chute 13, third nozzle 24 set at top blow oxygen lance 21 or tuyere 25 or 26.

Figure 2:
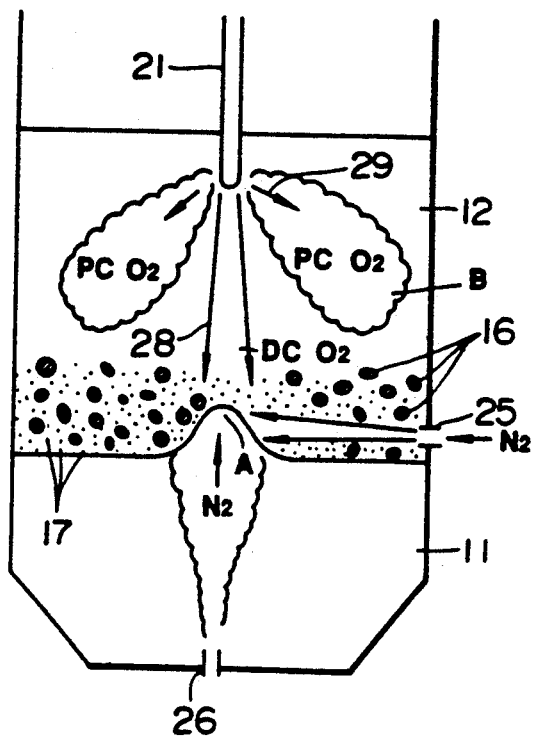
FIG. 2 is a schematic view illustrating a gas flow in a smelting reduction furnace forming a part of the apparatus shown in FIG. 1.

Subsequently, with specific reference to the drawings of FIGS. 2 to 5, relation between gas blow into smelting reduction furnace 10 and infurnace reaction will be now described in detail. FIG. 2 schematically illustrates a behavior of gas blown through side tuyere 25 and bottom tuyere 26 shown in FIG. 1. In FIG. 2, arrows 28 and 29 drawn below oxygen lance 21, each, show directions of oxygen gas injected respectively through first nozzles 22 for decarburization and second nozzles 23 for post-combustion. DC $O_2$ denotes oxygen gas blown in the direction shown by arrows 28 through nozzles 22 and PC $O_2$ oxygen gas blown in the direction shown by arrows 29 through nozzles 23. Throughout the reduction operation, operation of gas blows through oxygen lance 21, side tuyere 25 and bottom tuyere 26 are continuously carried out from the beginning to the end of the operation. The gas blows through the side tuyere and the bottom tuyere are coworked to diffuse molten metal into the slag, and resultantly, the gas blow increases drastically a reduction speed.

As described in the beginning of the detailed description, based on the finding that reduction of iron ore existing in slag layer 12 proceeds mostly by making use of C contained in molten metal as reducing agent, the present invention intends to diffuse molten metal actively into the zone where the iron ore is floating in a lower portion of the slag layer by means of strong stirring to raise the reduction speed. For this purpose, a swollen portion of molten metal (shown by A in FIG. 2) is preferably formed on the surface of molten metal 12 by blowing a stirring gas through bottom tuyere 26 and simultaneously, a stirring gas is blown in through side tuyere 25 so as to have at least a part of the side blown stirring gas hit portion A. Thanks to this side blow gas, the molten metal at the swollen portion of A is splashed into slag layer 12. An apparent specific gravity of the slag ranges normally 0.1 to 0.5, while a bulk specific gravity of the iron ore ranges about 2 to 5. Consequently, iron ore 16 contained in the slag is floating concentratedly in a lower portion of slag layer 12. When the swollen portion of A of the molten metal is splashed by means of the side blown stirring gas, splashed molten metal 17 is diffused into a zone of a lower portion of slag layer 12. C contained in the splashed molten metal reduces the iron ore. Thus, the reduction is carried out at high speed. To obtain such an effect, it is preferable that the side blow gas hits portion A of the molten metal as exactly as possible. In the plan view, side tuyere 25 and bottom tuyeres 26 are arranged so as to satisfy a positional relation as shown in (a) or (b) of FIG. 3.

Figures 3A, 3B:
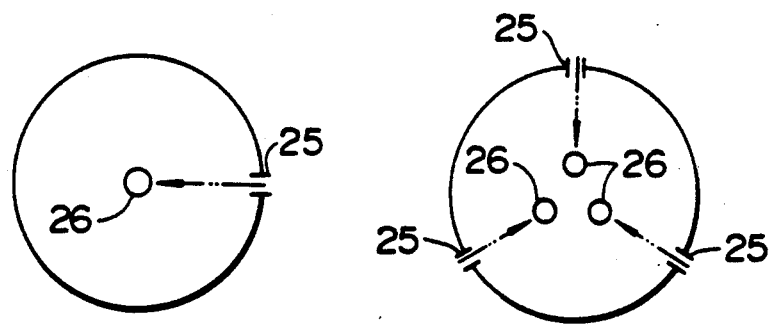
FIG. 3(a) is a view illustrating a positional relation between at least one side tuyere and at least one bottom tuyere and FIG. 3(b) is a view illustrating a positional relationship between three side tuyeres and three bottom tuyeres of the present invention.

FIG. 3(a) illustrates a positional relation when a single side tuyere 25 and a single bottom tuyere 26 are used, and FIG. 3(b) illustrates a positional relation in when three side tuyeres 25 and three bottom tuyeres 26 are used. In this FIG. 3, arrows show directions of gas blown through side tuyeres 25. Of course, the number and the position of side tuyeres 25 and bottom tuyeres 26 are not always subject only to those shown in FIG. 3 and are determined, depending on the capacity of the smelting reduction furnace in use and the amount of production thereof. Furthermore, a large amount of gas is required to be blown through both of side tuyeres 25 and bottom tuyeres 26 and to strongly be stirred. The amount of the gas blows is determined, depending on conditions such as an amount of molten metal and a depth of the molten metal. In addition to the diffusion work, the side blow gas stirs an upper portion of slag layer 12 where a zone of the post-combustion is formed. This is also hereinafter detailed.

Gas blown through side tuyeres 25 and bottom tuyeres 26 is, as above mentioned, at least one selected from the group consisting of $N_2$, Ar, CO, $CO_2$ and a process gas. It is preferable not to use $O_2$ gas. The reason for this is as follows: firstly, if a gas having a large mix ratio of $O_2$ is used as the side blow gas, this involves a fundermental problem that the reduction performed by the work of C contained in molten metal which has been splashed into a lower portion of slag layer 12 is impaired. Secondly, if $O_2$ gas is used, refractory lined on inwall of the smelting reduction furnace is heated up and is damaged. Furthermore, if $O_2$ is mixed into the bottom blow gas too much, CO gas is produced so much, as above-mentioned, that the molten metal is strongly and excessively stirred. As a result, the splash of the molten metal goes into a zone of an upper porton of the slag layer and reaches to the post-combustion zone(shown by B in FIG. 2) where combustion by PC $O_2$ takes place. Consequently, the post-combustion is impaired because C contained in the molten metal reacts with $O_2$ which should be used for the post-combustion.

In the present invention, a post-combustion zone is formed in area B as shown in FIG. 2, within slag layer 12 and simultaneously, a high degree of post-combustion is procured. In this manner, thanks to the method wherein the post-combustion zone is formed within the slag layer and the slag layer is strongly stirred by the side blow gas, it can be attained that the high degree of the post-combustion is maintained and the high heat transfer efficiency is gained. Consequently, oxygen gas for the post-combustion is required to be blown into slag layer 12 so that post-combustion zone B is formed within the slag layer.

It is specifically required that a level height of top blow oxygen lance 21 is placed so as to have an appropriate level height relative to the slag level and the molten metal level. In other words, if the nozzle level of any of nozzles 22, 23 and 24 placed in the top blow oxygen lance is higher than the upper surface level of slag layer 12, the post-combustion zone fails to be formed within the slag layer and the heat transfer efficiency is degraded. Contrarily, if the nozzle level is lower than the upper surface level of molten metal bath 11, the post-combustion zone also fails to be within the slag layer. The lower limit level of the top blow lance is the bottom level of the slag layer relative to the position of nozzles 22, 23 and 24.

Figure 4:
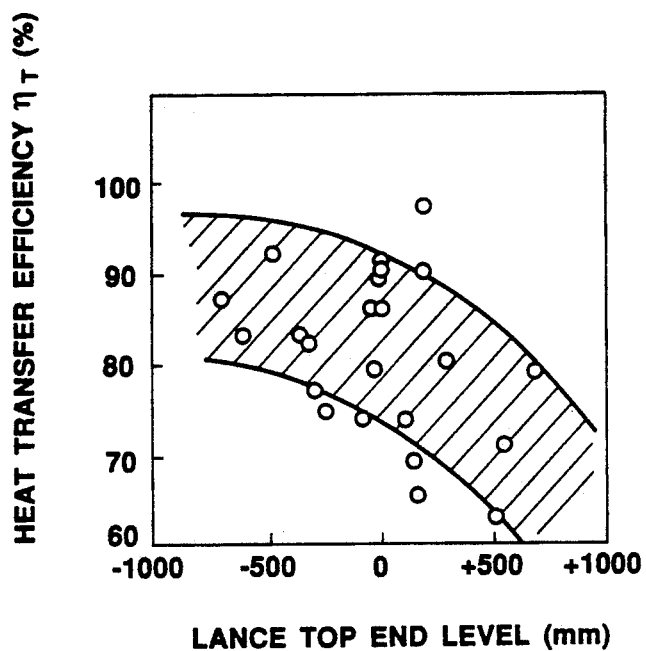
FIG. 4 is a graphic representation showing a relation between a level height of a top blow oxygen lance and heat transfer efficiency of the present invention.
Figure 5:
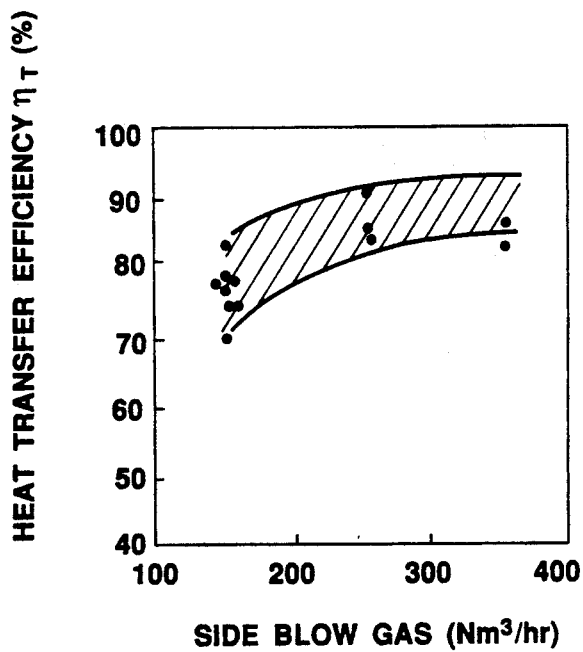
FIG. 5 is a graphic representation showing a relation between a side blow gas and the heat transfer efficiency of the present invention.

FIG. 4 shows the relation between a level height of the top end of the top blow oxygen lance and the heat transfer efficiency of the present invention, teaching that when the top end of the oxygen lance is too high from the slag surface, good heat transfer efficiency cannot be obtained. In respect of the abscissa, the figures of the right hand side of zero shows the level height when the top end of the oxygen lance is above the surface level of the slag layer, and those on the left hand side of zero show the level height when the top end of the oxygen lance is below the surface level of slag layer. FIG. 5 shows the relation between the side blow gas amount and the heat transfer efficiency. It is recognized from FIG. 5 that good heat transfer efficiency can be obtained if a large amount of the side blow gas is blown in through side tuyeres 25 and the slag layer is strongly stirred. The results shown in FIGS. 4 and 5 were obtained from an operation wherein a smelting reduction furnace with 50 tons capacity was employed and the molten metal was produced at a rate of 28 ton/hour.

According to the present invention, thanks to the high heat transfer efficiency, a high reduction speed can be gained by means of increasing the OD as mentioned above. In addition to this, thanks to the rise of the OD, the amount of carbonaceous material can be reduced. Resultantly, the unit consumption of carbonaceous material can be lowered and, at the same time, the P content in molten metal can be reduced since most of the P is brought, with the carbonaceous material, into the molten metal. Furthermore, if the OD becomes high, desulfurization by evaporation is activated, and therefore, the S content in the molten metal can be reduced. From these view points, the OD is set preferably to be 0.4 or more. The upper limit of the OD is 1 and the higher the OD is, the more preferable it is. However, 0.9 is to be the upper limit, in the light of the energy balance which is hereinafter discussed. If the OD is 0.7 or more, the reduction reaction in the smelting reduction furnace is promoted and the preheat and prereduction process making use of the preheat and prereduction furnace becomes needless and therefore, the construction cost of the preheat and prereduction is saved.

In the embodiment of the present invention, the reduction degree of a suspention preheater used as a preheat and prereduction furnace is no more than 15% so long as the operation is carried out on ordinary and appropriate conditions in the mentioned range of the OD and the temperature. The prereduction degree of the preheat and prereduction furnace is related closely to the OD and temperature of the exhaust gas and there is a case where the prereduction degree preferably and advantageously ranges more than 15% but 30% or less, dependent on the specification of the apparatus for the smelting reduction of the iron ore, operation conditions and features of materials to be charged. In addition, in response to the mentioned operational condition, as a preheat and prereduction furnace, at least one selected from the group consisting of a fluid bed furnace, a fluid bed furnace having a fine powder circulation system and jet flow bed furnace, in stead of the suspension heater.

Another feature of the present invention is to raise the post-combustion efficiency and to procure the energy balance of the whole steel works. Now, to obtain this energy balance, referring specifically to the drawing of FIG. 6, the relation between the OD of the exhaust gas generated in the smelting reduction furnace and the prereduction degree of the iron ore will be described.

Figure 6:
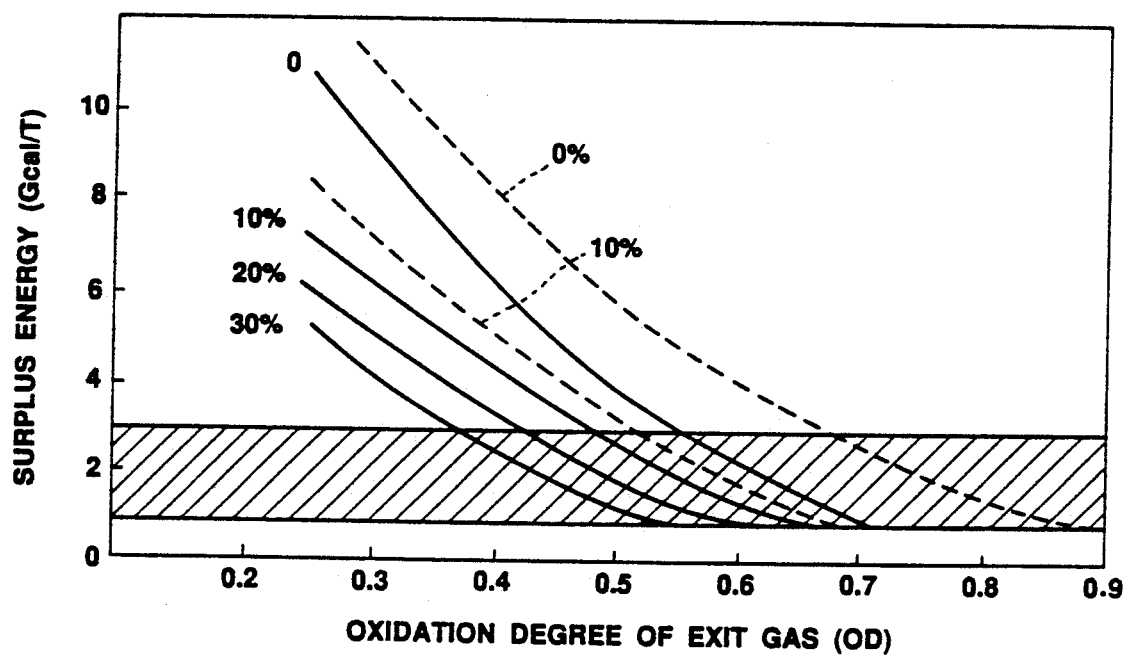
FIG. 6 is a graphic representation showing a relation between an oxidation degree and a surplus energy of the present invention.

FIG. 6 graphically represents the relation between the OD and surplus energy generated in the smelting reduction furnace given in FIG. 1. In FIG. 6, the slanted portion gives an appropriate area of the energy balance covering the whole steel works, the solid lines showing the energy balance of carbonaceous material having low volatile matters and the dotted lines that of carbonaceous material having high volatile matters relative to the prereduction degree, of which the percentage figures are indicated. The results were obtained from the operation of the smelting reduction furnace used in obtaining the results shown in FIGS. 4 and 5. According to these results shown in FIG. 6, if the OD is less than 0.4, the surplus energy is too much and this results in production of wasted energy. On the other hand, if the OD is over 0.9, the surplus of the produced energy is too little to satisfy the demanded amount of the steel works. As seen from FIG. 6, an appropriate and reasonable energy balance is attained when the prereduction degree is set as the range of less than 30%. If the prereduction degree is over 30%, the retention time of the iron ore in the preheat and prereduction furnace takes a long time and the restriction on the operation conditions becomes remarkably sever as mentioned herein-before.

Furthermore, in the prior art methods, the arrangements of the retention time of the iron ore in the preheat and prereduction furnace, the OD of the exhaust gas and the control of balancing between the charge of iron ore and discharge of the molten metal have been required as unsettled restrictive difficulties when the prereduction degree is set from 60 to 75%, but in the preferred embodiment of the present invention, these difficulties are greatly overcome, and, moreover, to reduce the construction and operation cost a preheat and prereduction furnace is provided, aiming mainly at preheating the iron ore in particular. This way of doing is based on the concept that CO gas generated in the smelting reduction furnace is post-combusted as much as possible and this heat due to the post-combustion is made use of, as an energy source, to decarburize and reduce the iron ore in the smelting reduction furnace. Accordingly, if the OD is less than 0.4, the temperature of the exhaust gas is not satisfactorily raised, while if it is over 0.9, the cost of the equipment and the operation remarkably goes up.

As to the temperature of the exhaust gas when the exhaust gas is introduced into a preheat and prereduction furnace, if it is less than 300° C., the iron ore is not satisfactorily heated up, while is more than 1300° C., the fire-resistant property of the preheat and prereduction furnace is of a serious problem. Furthermore, the temperature of the exhaust gas preferably ranges 700° to 1100° C. The reason is that if it ranges 500° to 600° C., the iron ore gets powdered due to the reduction degradation thereof, while it is over 1100° C., bulky lumps composed of granular grains of the iron ore are formed due to the sintering of the iron ore or the sticking of the metal iron and there is a possibility of troubles in promoting the reaction in the preheat and prereduction furnace or in charging the prereduced iron ore into the smelting reduction furnace.

As an example of the present invention, based on the preferred embodiment. A OD of 0.6 and the heat transfer efficiency of 95% was obtained, using coal of 1124 kg/molten metal ton and oxygen of 798 $Nm^3$/molten metal ton.

What is claimed is:

1. An apparatus for smelting reduction of iron ore comprising:
   at least one preheat and prereduction furnace which preheats and prereduces iron ore, the iron ore being prereduced to prereduction degree of less than 30%;
   a smelting reduction furnace into which the preheated and prereduced iron ore, carbonaceous material and flux are charged and in which the preheated and prereduced iron ore is reduced;
   a top blow oxygen lance having first nozzles for decarburization and second nozzles for post-combustion, oxygen gas being blown through the first nozzles and the second nozzles into the smelting reduction furnace; and
   at least one side tuyere placed in a side wall of the smelting reduction furnace and at least one bottom tuyere placed in a bottom wall of the smelting reduction furnace, a stirring gas being blown through the at least one side tuyere and the at least one bottom tuyere into the smelting reduction furnace.

2. The apparatus of claim 1, wherein said preheat and prereduction furnace includes being any one or two selected from the group consisting of a suspension preheater, a fluid bed furnace, a fluid bed furnace having a fine powder circulation system and a jet fluid bed furnace.

3. The apparatus of claim 1, which further comprises a high temperature dust collector wherein dust is removed from an exhaust gas, said exhaust gas being generated in the smelting reduction furnace and introduced directly into the high temperature dust collector from the smelting reduction furnace.

4. The apparatus of claim 1, wherein said top oxygen lance includes having at least one third nozzle placed in a top end portion of the top blow oxygen lance through which a raw material is blown with a carrier gas into the smelting reduction furnace, said raw material being at least selected from the group consisting of the preheated and prereduced iron ore, the carbonaceous material and the flux and said carrier gas being at least one selected from the group consisting of Ar, $N_2$, CO, $CO_2$ and a process gas.

* * * * *

UNITED STATES PATENT AND TRADEMARK OFFICE
CERTIFICATE OF CORRECTION

PATENT NO. : 5,074,530
DATED : December 24, 1991
INVENTOR(S) : IWASAKI, et al

It is certified that error appears in the above-indentified patent and that said Letters Patent is hereby corrected as shown below:

Column 3, line 44, delete "the".

Column 7, line 32, change "fundermental" to read --fundamental--.

Column 7, line 59, change "that a" to read --that the--.

Column 8, line 24, delete "the" before "molten".

Column 10, line 9, change "on the" to read --on a--.

Column 10, line 10, change "A OD" to read --The OD--.

Signed and Sealed this

Eighth Day of March, 1994

Attest:

BRUCE LEHMAN

*Attesting Officer*  *Commissioner of Patents and Trademarks*